United States Patent
Chou et al.

(10) Patent No.: US 8,020,818 B2
(45) Date of Patent: Sep. 20, 2011

(54) STAND

(75) Inventors: Chia-Shin Chou, Taipei Hsien (TW); Zhen-Xing Ye, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 12/752,139

(22) Filed: Apr. 1, 2010

(65) Prior Publication Data
US 2011/0127399 A1 Jun. 2, 2011

(30) Foreign Application Priority Data
Nov. 30, 2009 (CN) .................. 2009 1 0310706

(51) Int. Cl.
*F16M 11/00* (2006.01)
*F16M 11/24* (2006.01)
*A47B 97/04* (2006.01)
*A47G 1/24* (2006.01)

(52) U.S. Cl. .............. 248/176.1; 248/447; 248/454; 248/462; 248/165; 248/170; 248/441.1; 248/455

(58) Field of Classification Search ............ 248/176.1, 248/447, 454, 460, 462, 463, 646, 165, 170, 248/188, 917, 918, 441.1, 453, 455, 438
See application file for complete search history.

(56) References Cited

U.S. PATENT DOCUMENTS

| | | | |
|---|---|---|---|
| 4,372,630 A * | 2/1983 | Fuhri | 312/231 |
| 5,833,201 A * | 11/1998 | Graybill | 248/462 |
| 6,206,183 B1 * | 3/2001 | Helsel | 206/1.7 |
| D575,293 S * | 8/2008 | Derry et al. | D14/447 |
| 7,712,719 B2 * | 5/2010 | Derry et al. | 248/346.06 |
| 7,980,737 B2 * | 7/2011 | Hu | 362/382 |
| 2007/0096002 A1 * | 5/2007 | Knight | 248/460 |
| 2008/0265109 A1 * | 10/2008 | Derry et al. | 248/149 |
| 2009/0140119 A1 * | 6/2009 | To et al. | 248/455 |
| 2009/0184218 A1 * | 7/2009 | Buckles | 248/176.1 |
| 2010/0213330 A1 * | 8/2010 | Downing | 248/176.3 |
| 2010/0283222 A1 * | 11/2010 | Lin | 280/303 |

* cited by examiner

*Primary Examiner* — Terrell McKinnon
*Assistant Examiner* — Christopher Garft
(74) *Attorney, Agent, or Firm* — Altis Law Group, Inc.

(57) ABSTRACT

A stand includes a connecting member, a first supporting member pivotably connected to the connecting member and rotatable along a first direction, two second supporting members pivotably connected to the connecting member and rotatable along a second direction perpendicular to the first direction, and two blocking members pivotably connected to the second supporting members respectively, opposite to the connecting member.

10 Claims, 3 Drawing Sheets

STAND

BACKGROUND

1. Technical Field

The present disclosure generally relates to support stands and, particularly, to a stand to support a notebook computer.

2. Description of Related Art

Due to small size and light weight, notebook computers are easy to carry and use in a variety of occasions. However, people feel uncomfortable in using the notebook computer, especially when no appropriate place (for example when they are on the bed or outdoors) to support the notebook computer is available.

DETAILED DESCRIPTION

Figure 1:
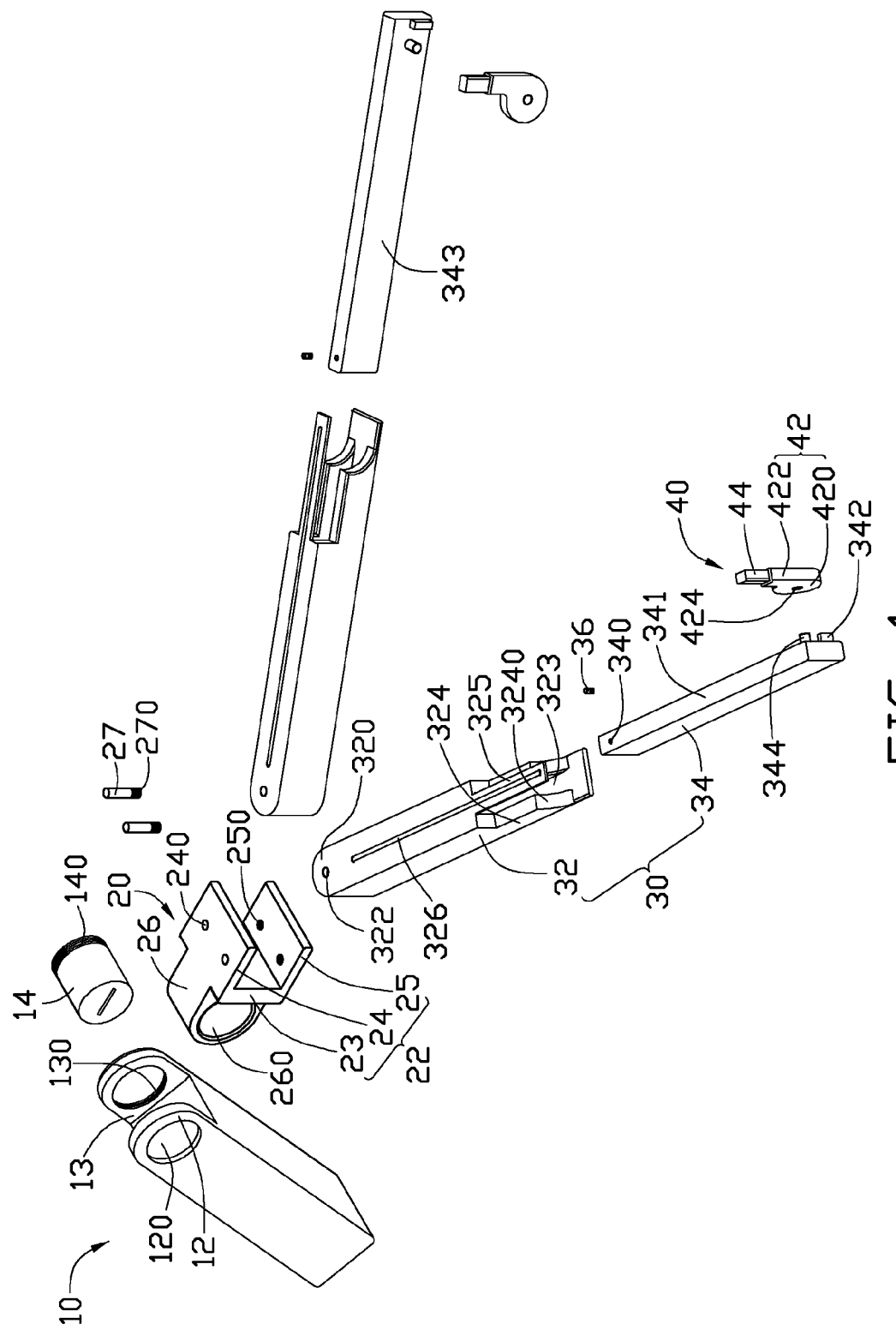
FIG. 1 is an exploded, isometric view of an exemplary embodiment of a stand.

Referring to FIG. 1, an exemplary embodiment of a stand includes a first supporting member 10, a connecting member 20, two second supporting members 30, and two blocking members 40. In one embodiment, the stand may support small sized devices, such as notebooks.

The first supporting member 10 is a rectangular-shaped pole. Two parallel connecting tabs 12 and 13 extend from one end of the first supporting member 10. The connecting tab 12 defines a pivot hole 120. The connecting tab 13 defines a fastening hole 130.

The connecting member 20 includes a U-shaped main body 22 and a pivoting portion 260 extending from the main body 22. The main body 22 includes a base panel 23, and opposite side panels 24 and 25 perpendicularly extending from opposite sides of the base panel 23. The side panel 24 defines two pivot holes 240. The side panel 25 defines two fastening holes 250 aligned with the pivot holes 240, respectively. The pivoting portion 26 extends from the base panel 23 opposite to the side panels 24 and 25. The pivoting portion 26 is generally cylindrical-shaped and axially defines a through hole 260. An axis of the through hole 260 is perpendicular to axes of the pivot holes 240.

Each second supporting member 30 includes a rotating portion 32 and a sliding portion 34. The rotating portion 32 is a rectangular-shaped pole. The rotating portion 32 includes a pivoting portion 320 at a first end of the rotating portion 32. The pivoting portion 320 is generally half cylindrical-shaped and axially defines a through hole 322. The rotating portion 32 longitudinally defines a receiving cavity 323 through a second end of the rotating portion 32 opposite to the first end. Two stepped sidewalls 324 are formed on the second end of the rotating portion 32 at opposite sides of the receiving cavity 323. Each stepped sidewalls 324 includes a curved wall 3240 opposite to the first end. A tongue 325 extends toward and above the receiving cavity 323. An interference avoiding incision is defined between the tongue 325 and each sidewall 324. The rotating portion 32 defines a sliding slot 326, extending from the first end of the rotating portion 32 to the tongue 325 and communicating with the receiving cavity 323.

The sliding portion 34 is bar-shaped to be slidably received in the receiving cavity 323 of the rotating portion 32. The sliding portion 34 includes a top wall 341 and a sidewall 343 perpendicular to the top wall 341. The top wall 341 defines a screw hole 340 adjacent a first end of the sliding portion 34. The sidewall 343 forms a stopping block 342 and a pivoting post 344 adjacent to the first end and between the stopping block 342 and a second end of the sliding portion 34 opposite to the first end.

Each blocking member 40 includes a main body 42, and a blocking portion 44. The main body 42 includes a round portion 420 and a connecting portion 422. The connecting portion 422 is tangent to the round portion 420. The round portion 420 defines a through hole 424. The blocking portion 44 is slidably mounted to the connecting portion 422.

Figure 2:
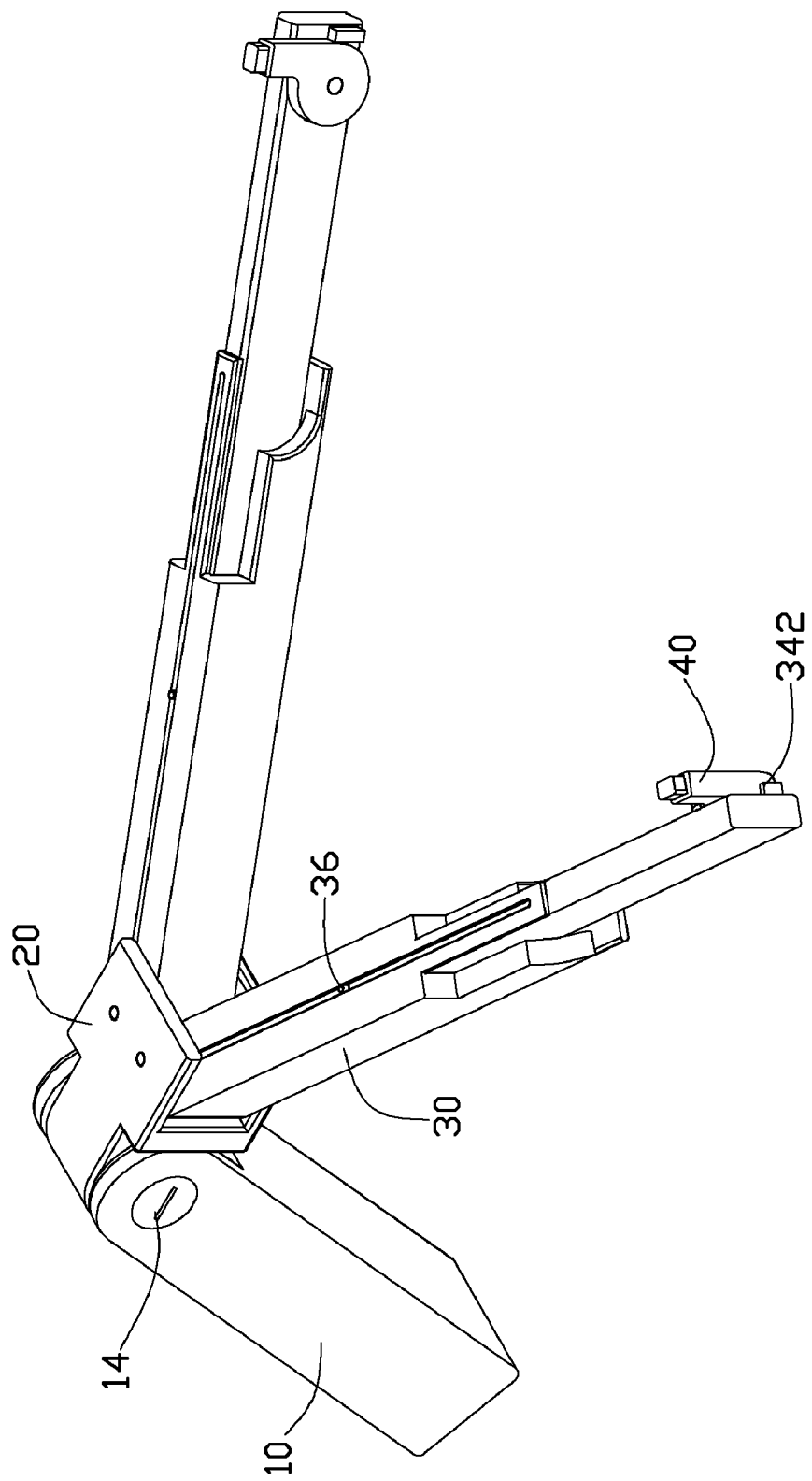
FIG. 2 is an assembled, isometric view of the stand of FIG. 1.

Referring to FIG. 2, in assembly, the pivoting portion 26 is placed between the connecting tabs 12 and 13, with two ends of the through hole 260 aligning with the pivot hole 120 and the fastening hole 130. A pivoting pin 14, with one end defining a threaded portion 140, extends through the pivot hole 120, to engage in the fastening hole 130 via the threaded portion 140.

Each second supporting member 30 is placed in the main body 22 of the connecting member 20, with the through hole 322 aligning with one pivot hole 240 and one fastening hole 250. Two pivoting pins 27, each with one end defining a threaded portion 270, extend through the pivot holes 240 and the through holes 322, to engage in the fastening holes 250. The second end of the sliding portion 34 with the screw hole 340 is accommodated in the receiving cavity 323, with the screw hole 340 aligning with the sliding slot 326. Two sliding pins 36 slidably extend through the sliding slots 326 to engage in the screw holes 340 of the sliding portions 34. Therefore, the sliding portions 34 can be slidably received in the receiving cavities 323. The pivoting posts 344 engage in the through holes 424 of the blocking members 40, to pivotably mount the blocking members 40 to the sliding portions 34. When the sliding portions 34 is pushed back into the receiving cavities 323, the blocking members 40 are placed onto the rotating portions 32 via the round portions 420 engaging with the corresponding curved walls 3240.

Figure 3:
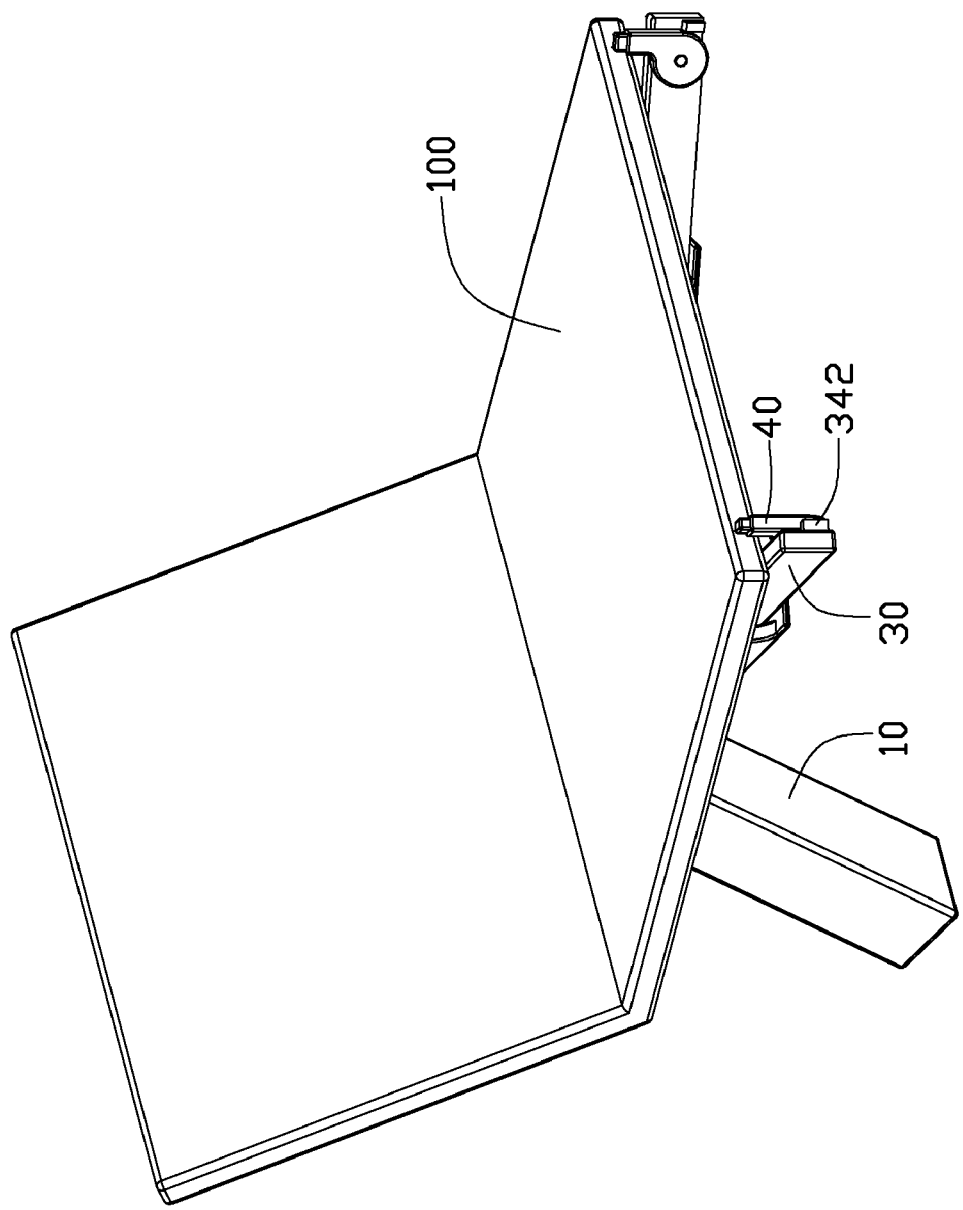
FIG. 3 is an isometric view of the stand of FIG. 2 in a use state.

Referring to FIG. 3, in use, the stand is adjusted to a suitable angle and height to form a tripod, by rotating the first supporting member 10 about the pivoting pin 14 along a first direction, rotating the second supporting members 30 about the connecting member 20 along a second direction perpendicular to the first direction, and sliding the sliding portions 34 relative to the rotating portions 32. The ends of the first supporting member 10 and the second supporting members 30 opposite to the pivoting pin 14 locate on a plane. The blocking members 40 rotate about the pivoting posts 344, make the connecting portions 422 resist against the stopping blocks 342. The blocking portions 44 extend out or withdraw toward the connecting portions 422, according to thickness of a notebook computer 100, to resist against a front side of the notebook computer 100. The notebook computer 100 is placed on a plane formed by the two supporting members 30.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A stand comprising:
   a connecting member;

a first supporting member pivotably connected to the connecting member and rotatable along a first direction;

two second supporting members pivotably connected to the connecting member and rotatable along a second direction perpendicular to the first direction; and two blocking members pivotably connected to the second supporting members respectively, opposite to the connecting member;

wherein each second supporting member comprises a rotating portion and a sliding portion slidably attached to the rotating portion lengthwise along the rotating portion, a sliding slot is defined in the rotating portion lengthwise along thereof, and a screw hole is defined in the sliding portion, a sliding pin slidably extends through the sliding slot to engage in the screw hole to position the sliding portion to the rotating portion;

wherein each rotating portion longitudinally defines a receiving cavity extending through a first end thereof for receiving the sliding portion therein;

wherein the first end of each rotating portion forms two stepped sidewalls at opposite sides of the receiving cavity, each stepped sidewall comprises a curved wall; and wherein each blocking member comprises a main body with a round portion, when the sliding portion is pushed back into the receiving cavity, the blocking member is placed onto the rotating portion via the round portion engaging with the corresponding curved wall.

2. The stand of claim 1, wherein the first supporting member is a rectangular-shaped pole, two connecting tabs extend from one end of the first supporting member, one connecting tab defining a pivot hole, the other connecting tab defining a fastening hole, wherein the connecting member comprises a pivoting portion axially defining a through hole, the pivoting portion locates between the connecting tabs, with the fastening hole and the pivot hole aligning with the through hole, a pivoting pin extends through the pivot hole and the through hole to engage in the fastening hole.

3. The stand of claim 2, wherein the connecting member further comprises a U-shaped main body located at one end of the pivoting portion, the main body of the connecting member comprises opposite side panels, one side panel defines two pivot holes, the other side panel defines two fastening holes corresponding to the pivot holes of the connecting member respectively, each rotating portion defines a through hole in a second end opposite to the first end thereof, the second ends of the rotating portions of the second supporting members are located between the side panels, with the pivot holes and the fastening holes of the connecting member aligning with the corresponding through holes of the rotating portions, two pivoting pins extend through the pivot holes of the connecting member and the through holes of the rotating portions to engage in the fastening holes of connecting member.

4. The stand of claim 1, wherein the sliding portion slides relative to the rotating portion, between the first end and the second end of the rotating portion.

5. The stand of claim 1, wherein, the sliding slot is define in the rotating portion, communicating with the receiving cavity, the screw hole is defined in a first end of the sliding portion.

6. The stand of claim 1, wherein the first end of the rotating portion forms a tongue extending towards and above the receiving cavity, the sliding slot extends to the tongue.

7. The stand of claim 5, wherein a second end of the sliding portion opposite to the first end forms a pivoting post, each blocking member defines a through hole pivotably receiving the pivoting post.

8. The stand of claim 7, wherein each blocking member further comprises a blocking portion slidably mounted to the main body of the blocking member, the through hole of the blocking member is defined in the main body of the blocking member.

9. The stand of claim 8, wherein the main body of the blocking member further comprises a connecting portion tangent to the round portion, the blocking portion is slidably mounted to the connecting portion.

10. The stand of claim 1, wherein the sliding portion defines a stopping block to resist against the main body of the blocking member.

* * * * *